US011991497B1

(12) United States Patent
Chen et al.

(10) Patent No.: US 11,991,497 B1
(45) Date of Patent: May 21, 2024

(54) ACOUSTIC DEVICE AND HOLDER FLATTENING FREQUENCY RESPONSE

(71) Applicant: xMEMS Labs, Inc., Santa Clara, CA (US)

(72) Inventors: Chao-Yu Chen, Kaohsiung (TW); Chiung C. Lo, San Jose, CA (US); Jemm Yue Liang, Sunnyvale, CA (US); Wen-Chien Chen, New Taipei (TW); Jye Ren, Taipei (TW)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/336,030

(22) Filed: Jun. 16, 2023

Related U.S. Application Data

(60) Provisional application No. 63/420,096, filed on Oct. 28, 2022.

(51) Int. Cl.

| | |
|---|---|
| ***H04R 1/28*** | (2006.01) |
| ***H04R 1/10*** | (2006.01) |
| ***H04R 1/24*** | (2006.01) |
| ***H04R 19/02*** | (2006.01) |

(52) U.S. Cl.
CPC ......... *H04R 1/2811* (2013.01); *H04R 1/1016* (2013.01); *H04R 1/24* (2013.01); *H04R 19/02* (2013.01); *H04R 2201/003* (2013.01)

(58) Field of Classification Search
CPC ...... H04R 1/2811; H04R 1/1016; H04R 1/24; H04R 19/02; H04R 2201/003
See application file for complete search history.

(56) References Cited

U.S. PATENT DOCUMENTS

| | | | | |
|---|---|---|---|---|
| 3,327,808 A * | 6/1967 | Shaper | H04R 1/2857 | 181/156 |
| 3,978,941 A * | 9/1976 | Siebert | H04R 1/2834 | 181/151 |
| 4,298,087 A * | 11/1981 | Launay | H04R 1/345 | 181/156 |
| 4,790,407 A * | 12/1988 | Yamamoto | H04R 1/2857 | 381/86 |

(Continued)

FOREIGN PATENT DOCUMENTS

| | | | |
|---|---|---|---|
| CN | 113271508 A * | 8/2021 | H04R 1/025 |
| CN | 116939081 A * | 10/2023 | H04M 1/03 |
| EP | 3815795 A1 * | 5/2021 | B06B 1/06 |

*Primary Examiner* — Angelica M McKinney
(74) *Attorney, Agent, or Firm* — Winston Hsu

(57) ABSTRACT

An acoustic device includes a first sound producing component and a back cavity structure. The first sound producing component has a first front side and a first back side, wherein the first sound producing component is a high frequency sound unit, and the first front side faces a sound propagating opening of the acoustic device. The back cavity structure is connected to the first back side of the first sound producing component. The first sound producing component produces a first acoustic wave from the first front side towards the sound propagating opening, and the first sound producing component produces a second acoustic wave from the first back side towards a back cavity of the back cavity structure. The back cavity structure is configured to flatten a peak or a dip of a frequency response of the first sound producing component.

30 Claims, 9 Drawing Sheets

(56) References Cited

U.S. PATENT DOCUMENTS

| | | | | | |
|---|---|---|---|---|---|
| 5,194,701 | A * | 3/1993 | Yamada-Scriba | H04R 1/288 | 181/151 |
| 5,513,270 | A * | 4/1996 | Lewis | H04R 1/2826 | 381/338 |
| 6,896,097 | B2 * | 5/2005 | Nishikawa | H04R 1/025 | 181/207 |
| 7,252,176 | B2 * | 8/2007 | Moore | H04R 1/30 | 381/345 |
| 10,477,302 | B2 * | 11/2019 | Martincic | H04R 1/2896 | |
| 10,631,086 | B1 * | 4/2020 | Bagg | H04R 1/2811 | |
| 2004/0142731 | A1 * | 7/2004 | Ho | H04M 1/035 | 455/569.1 |
| 2008/0013768 | A1 * | 1/2008 | Hayashi | H04R 1/347 | 381/337 |
| 2010/0142741 | A1 * | 6/2010 | Plummer | H04R 1/2857 | 381/345 |
| 2011/0235845 | A1 * | 9/2011 | Wang | H04R 1/345 | 381/386 |
| 2021/0250689 | A1 * | 8/2021 | Liang | H04R 3/14 | |

* cited by examiner

ACOUSTIC DEVICE AND HOLDER FLATTENING FREQUENCY RESPONSE

CROSS REFERENCE TO RELATED APPLICATIONS

This application claims the benefit of U.S. Provisional Application No. 63/420,096, filed on Oct. 28, 2022. The content of the application is incorporated herein by reference.

BACKGROUND OF THE INVENTION

1. Field of the Invention

The present application relates to an acoustic device and a holder, and more particularly, to an acoustic device and a holder capable of flattening frequency response.

2. Description of the Prior Art

Since acoustic devices including a MEMS (Micro Electro Mechanical System) acoustic component (e.g., a MEMS sound producing component or a MEMS microphone) can be widely used in various electronic devices due to their small size, the acoustic devices are developed rapidly in recent years. Normally, the performance of the acoustic device is related to the frequency response of the acoustic device. Thus, in order to make the acoustic device have a high performance, the acoustic device needs to be designed to have the suitable frequency response.

SUMMARY OF THE INVENTION

It is therefore a primary objective of the present invention to provide an acoustic device having a flatter frequency response.

An embodiment of the present invention provides an acoustic device including a first sound producing component and a back cavity structure. The first sound producing component has a first front side and a first back side, wherein the first sound producing component is a high frequency sound unit, and the first front side faces a sound propagating opening of the acoustic device. The back cavity structure is connected to the first back side of the first sound producing component. The first sound producing component produces a first acoustic wave from the first front side towards the sound propagating opening, and the first sound producing component produces a second acoustic wave from the first back side towards a back cavity of the back cavity structure. The back cavity structure is configured to flatten a peak or a dip of a frequency response of the first sound producing component.

Another embodiment of the present invention provides a holder disposed or to be disposed within an acoustic device. The holder includes a back cavity structure formed within the holder. When the holder is disposed within the acoustic device, a first sound producing component is disposed on the holder, the back cavity structure is connected to a first back side of the first sound producing component, the first sound producing component produces a first acoustic wave from a first front side towards a sound propagating opening of the acoustic device, and the first sound producing component produces a second acoustic wave from the first back side towards a back cavity of the back cavity structure. The first sound producing component is a high frequency sound unit. A length of an acoustic path within the back cavity is a half wavelength or a quarter wavelength corresponding to a frequency, such that a frequency response of the first sound producing component at the frequency is flattened.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
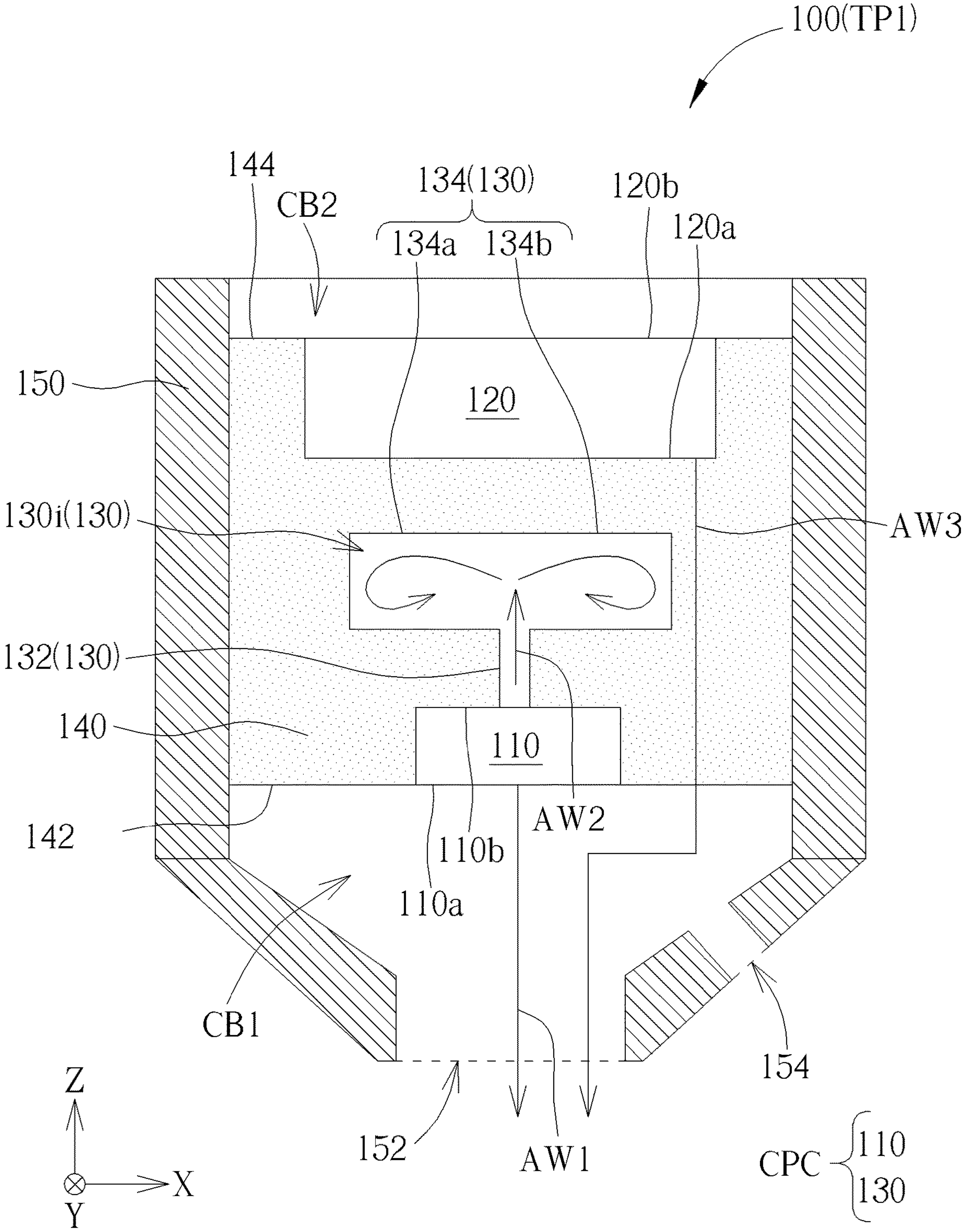
FIG. 1 is a schematic diagram of a cross sectional view illustrating an acoustic device according to an embodiment of a first type of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of the present invention, the corresponding features, areas, steps, operations and/or components would be pointed to existence, but not limited to the existence of one or a plurality of the corresponding features, areas, steps, operations and/or components.

In the following description and in the claims, when “a A1 component is formed by/of B1”, B1 exist in the formation of A1 component or B1 is used in the formation of A1 component, and the existence and use of one or a plurality of other features, areas, steps, operations and/or components are not excluded in the formation of A1 component.

In the following description and in the claims, the term “substantially” generally means a small deviation may exist or not exist. For instance, the terms “substantially parallel” and “substantially along” means that an angle between two components may be less than or equal to a certain degree threshold, e.g., 10 degrees, 5 degrees, 3 degrees or 1 degree. For instance, the term “substantially aligned” means that a deviation between two components may be less than or equal to a certain difference threshold, e.g., 2 μm or 1 μm. For instance, the term “substantially the same” means that a deviation is within, e.g., 10% of a given value or range, or mean within 5%, 3%, 2%, 1%, or 0.5% of a given value or range.

In the description and following claims, the term “horizontal direction” generally means a direction parallel to a horizontal surface, the term “horizontal surface” generally means a surface parallel to a direction X and direction Y in the drawings (i.e., the direction X and the direction Y of the present invention may be considered as the horizontal directions), the term “vertical direction” generally means a direction parallel to a direction Z and perpendicular to the horizontal direction in the drawings, and the direction X, the direction Y and the direction Z are perpendicular to each other. In the description and following claims, the term “top view” generally means a viewing result viewing along the vertical direction. In the description and following claims, the term “cross-sectional view” generally means a viewing result viewing a structure cutting along the vertical direction along the horizontal direction.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, the acoustic device may include an acoustic transducer configured to perform an acoustic transformation, wherein the acoustic transformation may convert signals (e.g. electric signals or signals with other suitable type) into an acoustic wave, or may convert an acoustic wave into signals with other suitable type (e.g. electric signals). In some embodiments, the acoustic transducer may be a sound producing component, a speaker, a micro speaker or other suitable device, so as to convert the electric signals into the acoustic wave, but not limited thereto. In some embodiments, the acoustic transducer may be a sound measuring device, a microphone or other suitable device, so as to convert the acoustic wave into the electric signals, but not limited thereto. For instance, in the following, the acoustic device may be an earphone or an earbud, and the acoustic transducer may be a sound producing component, but not limited thereto.

Referring to FIG. 1, FIG. 1 is a schematic diagram of a cross sectional view illustrating an acoustic device according to an embodiment of a first type of the present invention. As shown in FIG. 1, the acoustic device 100 includes a first sound producing component 110, and the acoustic device 100 optionally includes a second sound producing component 120, wherein the first sound producing component 110 and the second sound producing component 120 are configured to perform the acoustic transformation converting electric signals into acoustic waves.

A frequency range of the acoustic wave produced by the first sound producing component 110 and a frequency range of the acoustic wave produced by the second sound producing component 120 may be designed based on requirement(s). For instance, in an embodiment, the first sound producing component 110 may produce the acoustic wave with the frequency higher than a specific frequency to serve as a high frequency sound unit (tweeter), and the second sound producing component 120 may produce the acoustic wave with the frequency lower than another specific frequency to serve as a low frequency sound unit (woofer), but not limited thereto. That is to say, the first sound producing component 110 may produce the acoustic wave in a first frequency range, the second sound producing component 120 may produce the acoustic wave in a second frequency range, neither the first frequency range nor the second frequency range totally covers the human audible frequency range (e.g., from 20 Hz to 20 kHz), and an average value of the first frequency range is higher than an average value of the second frequency range, but not limited thereto. Note that the specific frequencies may be values ranging from 800 Hz to 4 kHz (e.g., 1.44 kHz), but not limited thereto.

In an embodiment, the first sound producing component 110 may be a micro-speaker, where a dimension (e.g., length or width) of the micro-speaker may be less than 15 mm or even less than 10 mm, and a thickness (height) of the micro-speaker may be less than 2 mm, but not limited thereto. Moreover, the first sound producing component 110 may be fabricated via MEMS (Micro Electro Mechanical System) fabrication process, but not limited thereto.

The first sound producing component 110 may comprise a first membrane. Membrane design of/for the first sound producing component 110 is not limited. In an embodiment, the first membrane of the first sound producing component 110 may have a membrane resonance frequency greater than 13 KHz or 20 KHz, or may follow the design principle disclosed in U.S. Pat. Nos. 10,805,751 or 11,057,716, but not limited thereto.

Figure 11:
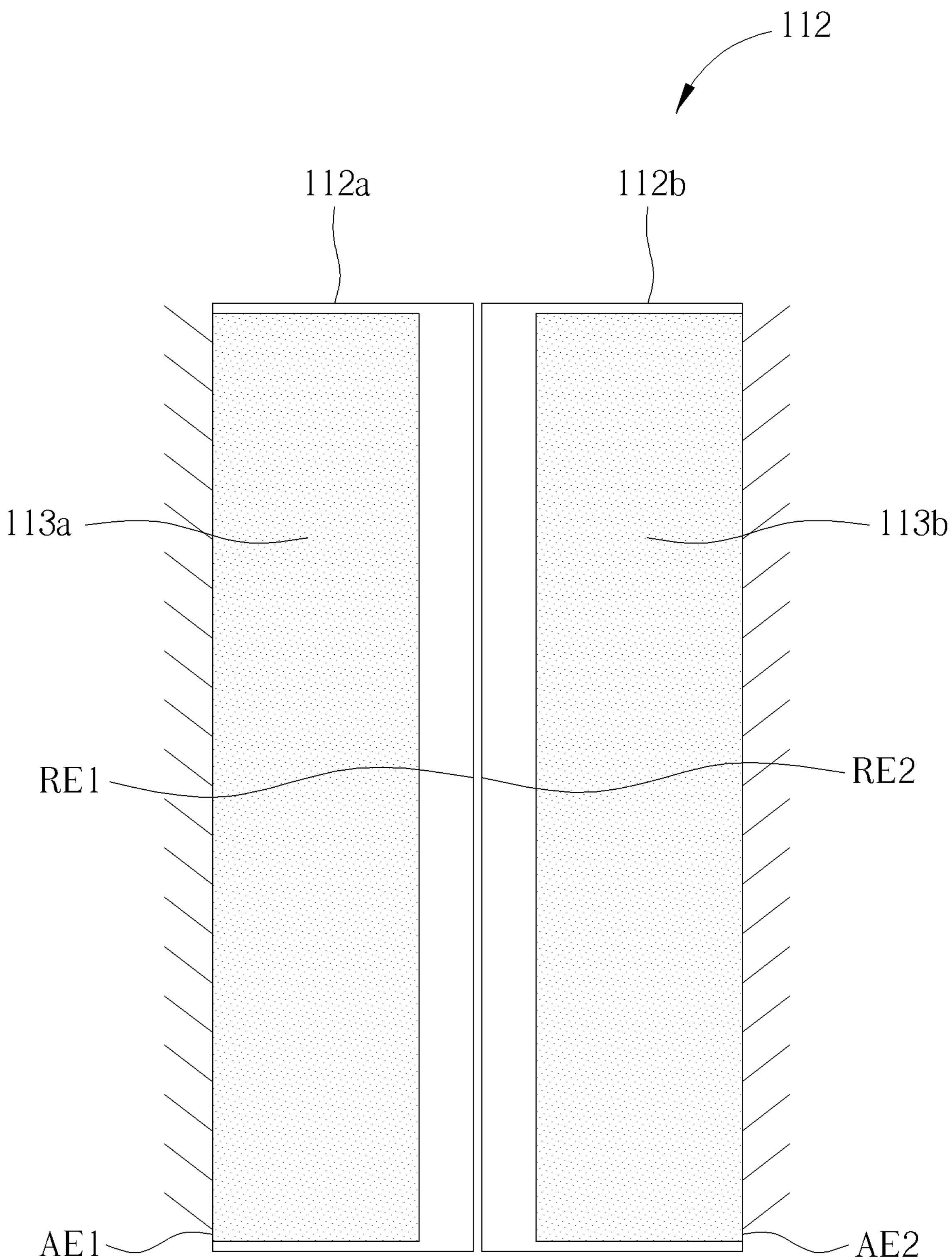
FIG. 11 is a schematic diagram illustrating a membrane of a sound producing component according to an embodiment of the present invention.

In an embodiment, (a bascule-type) membrane design disclosed in U.S. Pat. No. 11,172,300 or application Ser. No. 17/720,333 may be exploited within the first sound producing component 110. Specifically, the first sound producing component 110 may comprise a first membrane 112, and the first membrane 112 may comprise a membrane subpart 112*a* and a membrane subpart 112*b*, as shown in FIG. 11, with actuators 113*a* and 113*b* disposed thereon, respectively, where the membrane subpart 112*a* is opposite to the membrane subpart 112*b* in the top view. Specifically, the membrane subpart 112*a* may comprise an anchored edge AE1 and a released edge RE1; the membrane subpart 112*b* may comprise an anchored edge AE2 and a released edge RE2. The released edge RE1 may be opposite to the released edge RE2 in the top view. In an embodiment, an aspect ratio of the membrane 112 or an aspect ratio of the first sound producing component 110 may be larger than 2, wherein the aspect ratio is a ratio of length (corresponding to long side) relative to width (corresponding to shorter side) thereof.

Content of U.S. Pat. Nos. 10,805,751, 11,057,716, 11,172,300 and application Ser. No. 17/720,333 are incorporated herein by reference.

In an embodiment, the second sound producing component 120 may be realized by a MEMS device/chip, a dynamic driver (DD) or a balanced armature driver (BA), which is not limited thereto.

For instance, in another embodiment, the first sound producing component 110 and the second sound producing component 120 may produce the acoustic waves with the frequency range covering the human audible frequency range (e.g., from 20 Hz to 20 kHz), but not limited thereto.

In the present invention, the first sound producing component 110 may be a package or a MEMS chip having a first membrane, and the second sound producing component 120 may be a package or a MEMS chip having a second membrane, wherein the first membrane and the second membrane are actuated through actuators to produce the acoustic waves. For example, the first sound producing component 110 may have the first membrane and the actuator(s) actuating the first membrane, the second sound producing component 120 may have the second membrane and the actuator(s) actuating the second membrane.

The first membrane and the second membrane may be actuated by any suitable actuating method. In the present invention, the actuator has a monotonic electromechanical converting function with respect to the movement of the membrane along a direction (e.g., the direction Z). In some embodiments, the actuator may include a piezoelectric actuator, an electrostatic actuator, a nanoscopic-electrostatic-drive (NED) actuator, an electromagnetic actuator or any other suitable actuator, but not limited thereto. For example, in an embodiment, the actuator may include a piezoelectric actuator, the piezoelectric actuator may contain such as two electrodes and a piezoelectric material layer (e.g., lead zirconate titanate, PZT) disposed between the electrodes, wherein the piezoelectric material layer may actuate the membrane based on driving signals (e.g., driving voltages and/or driving voltage difference between two electrodes) received by the electrodes, but not limited thereto. For example, in another embodiment, the actuator may include an electromagnetic actuator (such as a planar coil), wherein the electromagnetic actuator may actuate the membrane based on a received driving signals (e.g., driving current) and a magnetic field (i.e. the membrane may be actuated by the electromagnetic force), but not limited thereto. For example, in still another embodiment, the actuator may include an electrostatic actuator (such as conducting plate) or a NED actuator, wherein the electrostatic actuator or the NED actuator may actuate the membrane based on a received driving signals (e.g., driving voltage) and an electrostatic field (i.e. the membrane may be actuated by the electrostatic force), but not limited thereto. In the following, the actuator may be a piezoelectric actuator for example.

As shown in FIG. 1, the acoustic device 100 includes an outer housing structure 150, wherein the first sound producing component 110 and the second sound producing component 120 are disposed in the outer housing structure 150. In FIG. 1, the outer housing structure 150 has a sound propagating opening 152 configured to be a sound outlet (i.e., a user hears the sound from the sound propagating opening 152), and a first front side 110*a* of the first sound producing component 110 is closer to the sound propagating opening 152 than a first back side 110*b* of the first sound producing component 110 (i.e., the first front side 110*a* and the first back side 110*b* of the first sound producing component 110 are opposite sides). For example, the first front side 110*a* of the first sound producing component 110 may face the sound propagating opening 152, but not limited thereto. Optionally, a second front side 120*a* of the second sound producing component 120 is closer to the sound propagating opening 152 than a second back side 120*b* of the second sound producing component 120 (i.e., the second front side 120*a* and the second back side 120*b* of the second sound producing component 120 are opposite sides). For example, the second front side 120*a* of the second sound producing component 120 may face the sound propagating opening 152, but not limited thereto.

In the present invention, the first sound producing component 110 and the second sound producing component 120 may be disposed in the outer housing structure 150 in any suitable way. As shown in FIG. 1, the acoustic device 100 includes a holder 140 on which the first sound producing component 110 and the second sound producing component 120 are disposed, and the holder 140 is disposed in the outer housing structure 150 and fixed in the outer housing structure 150, so as to make the first sound producing component 110 and the second sound producing component 120 be disposed in the outer housing structure 150.

In FIG. 1, the first sound producing component 110 is disposed on a first holding side 142 of the holder 140, the second sound producing component 120 is disposed on a second holding side 144 of the holder 140, and the second holding side 144 is opposite to the first holding side 142. For example, the first back side 110*b* of the first sound producing component 110 may face the first holding side 142 of the holder 140, and the second front side 120*a* of the second sound producing component 120 may face the second holding side 144 of the holder 140, but not limited thereto.

The holder 140 may include any suitable material and be formed by any suitable method. For example, the holder 140 may include polymer, metal, any other suitable material or a combination thereof. For example, the holder 140 may be formed by a molding process, but not limited thereto.

In FIG. 1, the outer housing structure 150 has a first cavity CB1 and a second cavity CB2, wherein the first cavity CB1 is between the sound propagating opening 152 and the second cavity CB2, and the first sound producing component 110 and the second sound producing component 120 are between the first cavity CB1 and the second cavity CB2. For example, the holder 140 may be between the first cavity CB1 and the second cavity CB2, but not limited thereto. For example, the first front side 110*a* of the first sound producing component 110 is closer to the first cavity CB1 than the first back side 110*b* of the first sound producing component 110, and the second front side 120*a* of the second sound producing component 120 is closer to the first cavity CB1 than the second back side 120*b* of the second sound producing component 120. For example, the first front side 110*a* of the first sound producing component 110 and the second front side 120*a* of the second sound producing component 120 may face the first cavity CB1, and the first back side 110*b* of the first sound producing component 110 and the second back side 120*b* of the second sound producing component 120 may face the second cavity CB2, but not limited thereto.

In the present invention, as shown in FIG. 1, the first sound producing component 110 produces a first acoustic wave AW1 from the first front side 110*a* towards the sound propagating opening 152, and the first sound producing component 110 produces a second acoustic wave AW2 from the first back side 110*b*, wherein a phase difference between the first acoustic wave AW1 and the second acoustic wave AW2 may be 180 degrees. In some embodiments, the first acoustic wave AW1 and the second acoustic wave AW2 are simultaneously generated by the first membrane of the first sound producing component 110. In FIG. 1, the first acoustic wave AW1 may pass through the first front side 110*a* of the first sound producing component 110, the first cavity CB1 and the sound propagating opening 152 in sequence. In the present invention, the second membrane of the second sound producing component 120 produces a third acoustic wave AW3 from the second front side 120*a* towards the sound propagating opening 152, and the third acoustic wave AW3 passes through the first cavity CB1 and the sound propagating opening 152 in sequence.

Figure 2:
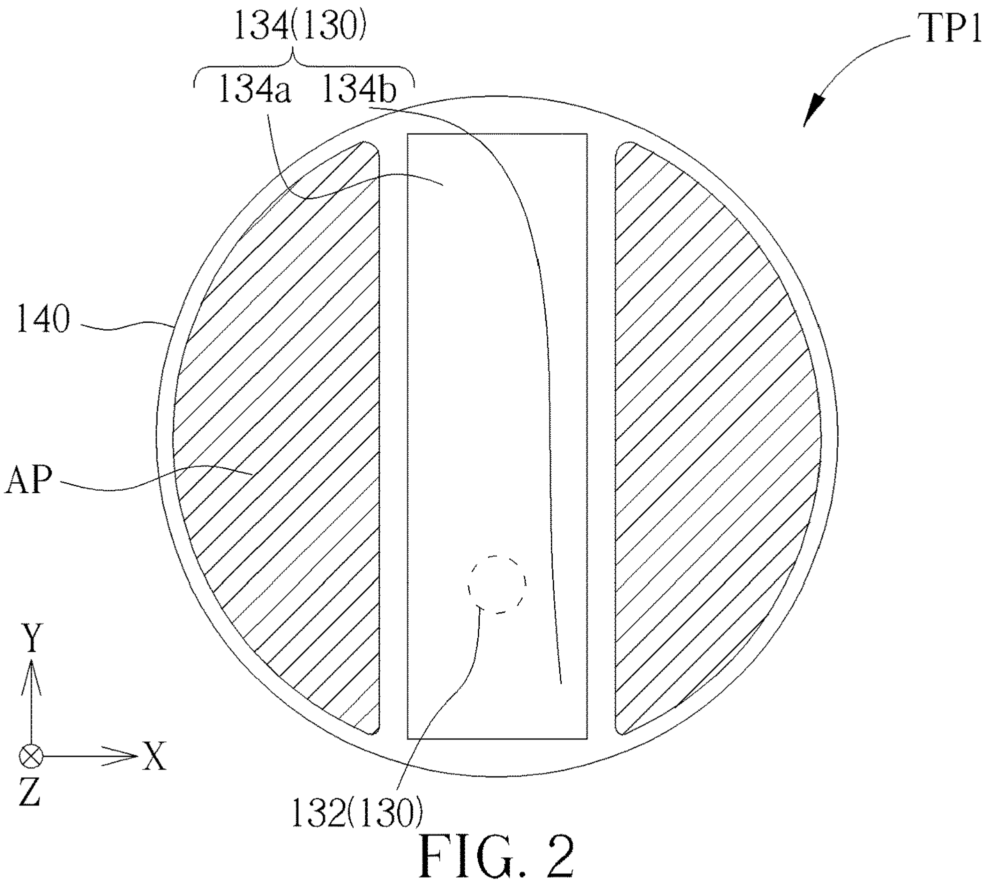
FIG. 2 is a schematic diagram illustrating a back cavity structure of the acoustic device according to an embodiment of the first type of the present invention.
Figure 3:
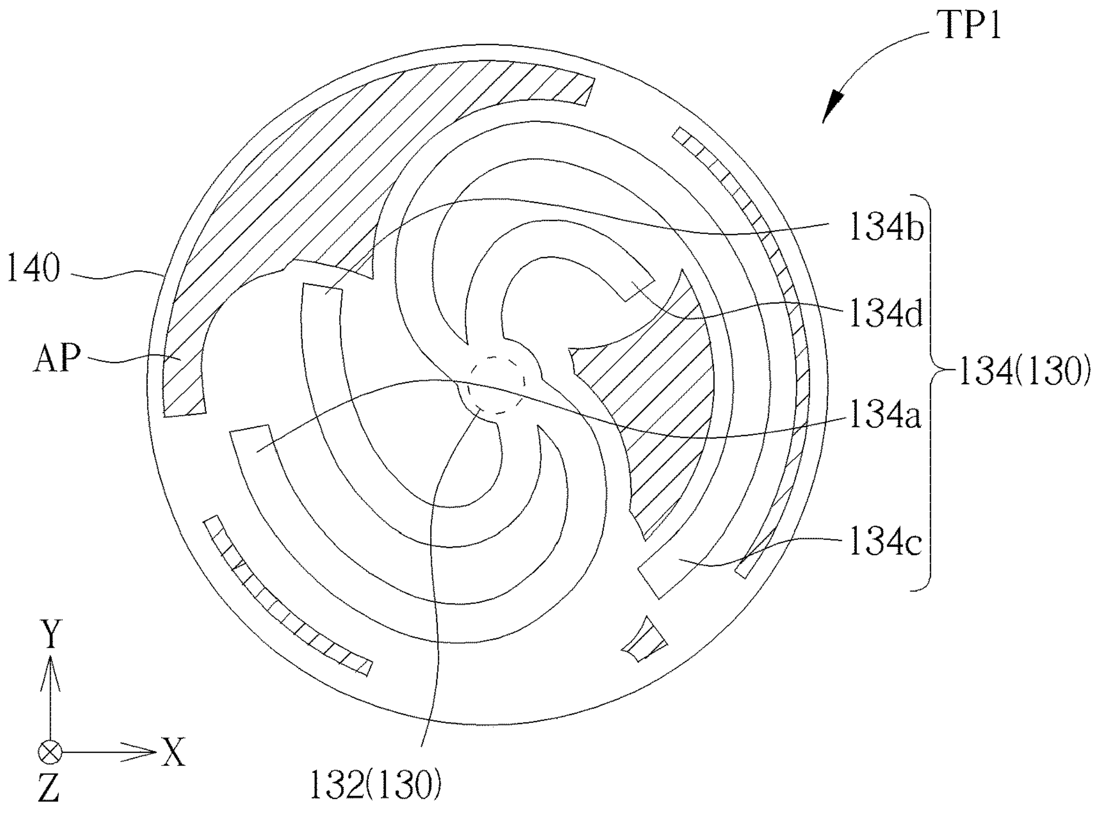
FIG. 3 is a schematic diagram illustrating a back cavity structure of the acoustic device according to an embodiment of the first type of the present invention.

In FIG. 1, since the third acoustic wave AW3 propagates towards the sound propagating opening 152, the third acoustic wave AW3 needs to pass through the holder 140. In some embodiments, the holder 140 may include at least one air passage AP (e.g., the air passage AP is shown in FIG. 2 and FIG. 3) connected between the first holding side 142 and the second holding side 144, and the third acoustic wave AW3 may pass through the air passage AP from the second holding side 144 towards the first holding side 142, such that the third acoustic wave AW3 propagates towards the sound propagating opening 152. Therefore, as shown in FIG. 1, the first acoustic wave AW1 propagates from the first holding side 142 of the holder 140 towards the sound propagating opening 152, and the third acoustic wave AW3 propagates from the second holding side 144 towards the sound propagating opening 152 by passing through the air passage AP.

As shown in FIG. 1, the acoustic device 100 includes a back cavity structure 130 connected to the first back side 110*b* of the first sound producing component 110, and a back cavity 130*i* exists inside the back cavity structure 130. Since the back cavity structure 130 connected to the first back side 110*b* of the first sound producing component 110, the first sound producing component 110 produces the second acoustic wave AW2 from the first back side 110*b* towards the back cavity 130*i*.

The position of the back cavity structure 130 may be designed based on requirement(s). In FIG. 1, the back cavity structure 130 may be (formed within the holder 140) between the first sound producing component 110 and the second sound producing component 120, but not limited thereto. For example, the back cavity structure 130 may be between the first back side 110*b* of the first sound producing component 110 and the second front side 120*a* of the second sound producing component 120, but not limited thereto.

In the present invention, the back cavity structure 130 may be realized in any suitable way. In some embodiments, as shown in FIG. 1, the holder 140 may have the back cavity structure 130, and the back cavity 130*i* is an empty space in the holder 140, but not limited thereto.

In principle, a frequency response of the sound producing component is related to the performance and operation of the sound producing component. If the frequency response of the sound producing component has at least one evident (or extreme) peak and/or at least one evident (or extreme) dip, in the operation of this sound producing component, the signal providing to this sound producing component for producing the acoustic wave with the wavelength corresponding to the peak or dip needs to be specially designed, so as to make the sound pressure level (SPL) be not evidently (or extremely) high or evidently (or extremely) low. In above condition, the sound producing component would not be easily operated and be hard to have the high performance in its sound-producing frequency range. On the contrary, if the sound producing component has a frequency response with no evident (or extreme) peak and no evident (or extreme) dip, this sound producing component would be easily operated and easily has the high performance in its sound-producing frequency range.

In the present invention, the frequency response of the first sound producing component 110 is a measuring result of the first acoustic wave AW1 in the frequency response measuring process.

In the present invention, the back cavity structure 130 is configured to flatten the peak and/or the dip of the frequency response of the first sound producing component 110, and any suitable design may be applied to the back cavity structure 130 for flattening the peak and/or the dip of the frequency response of the first sound producing component 110. In the following, a structure combined by the first sound producing component 110 and the back cavity structure 130 is referred as a compensated sound producing component CPC, and a frequency response of the compensated sound producing component CPC is a measuring result of the compensated sound producing component CPC in the frequency response measuring process.

In other words, without the back cavity structure 130 disposed on the first back side 110*b*, the frequency response of the first sound producing component 110 may have a peak or a dip at certain frequency. When the frequency response has a dip at certain frequency, acoustic energy at the certain frequency would be enhanced, by disposing the back cavity structure 130 (which is properly designed, e.g., with acoustic path as half wavelength λ/2) on the first back side 110*b* of the first sound producing component 110. Therefore, the frequency response would be flattened at the certain frequency (compared to the case without the back cavity structure) by disposing the back cavity structure on the back side of the first sound producing component. On the other hand, when the frequency response has a peak at certain frequency, acoustic energy at the certain frequency would be diminished, by disposing the back cavity structure 130 (which is properly designed, e.g., with acoustic path as quarter wavelength λ/4) on the first back side 110*b* of the first sound producing component 110. Therefore, the frequency response would be flattened at the certain frequency (compared to the case without the back cavity structure) by disposing the back cavity structure on the back side of the first sound producing component.

According to the frequency response of the first sound producing component 110, the back cavity structure 130 may be designed to relate to at least one target peak wavelength corresponding to the target peak(s) desired to be flattened and/or at least one target dip wavelength corresponding to the target dip (s) desired to be flattened. In the comparison between the frequency responses of the first sound producing component 110 and the compensated sound producing component CPC, the target peak and/or the target dip of the frequency response of the first sound producing component 110 is flattened.

Note that, when the target peak of the frequency response of the first sound producing component 110 is flattened, a magnitude corresponding to the target peak wavelength in the frequency response of the compensated sound producing component CPC is lower than a peak magnitude corresponding to the target peak wavelength in the frequency response of the first sound producing component 110, or a peak of the frequency response of the compensated sound producing component CPC related to the target peak of the frequency response of the first sound producing component 110 is smaller (lower) than the target peak of the frequency response of the first sound producing component 110.

Note that, when the target dip of the frequency response of the first sound producing component 110 is flattened, a magnitude corresponding to the target dip wavelength in the frequency response of the compensated sound producing component CPC is higher than a dip magnitude corresponding to the target dip wavelength in the frequency response of the first sound producing component 110, or a dip of the frequency response of the compensated sound producing component CPC related to the target dip of the frequency response of the first sound producing component 110 is smaller (shallower) than the target dip of the frequency response of the first sound producing component 110.

In some embodiments, compared with the frequency response of the first sound producing component 110, owing to the existence of the back cavity structure 130, the peak and/or the dip may be not evident and not extreme in the frequency response of the compensated sound producing component CPC.

As shown in FIG. 1, since the second acoustic wave AW2 propagates from the first back side 110*b* towards the back cavity 130*i*, the back cavity structure 130 flattens the peak and/or the dip of the frequency response of the first sound producing component 110.

As shown in FIG. 1, in a first type TP1 of the back cavity structure 130, the back cavity structure 130 resonates to flatten the peak and/or the dip of the frequency response of the first sound producing component 110. When the second acoustic wave AW2 propagates towards the back cavity 130*i*, the back cavity structure 130 resonates at the target peak wavelength and/or the target dip wavelength, such that the peak and/or the dip would be flattened by the resonation of/within the back cavity structure 130.

Equivalently, when the back cavity structure 130 resonates at the target wavelength, a first compensating wave with the target wavelength is generated, the first compensating wave has a phase delay with respect to the first acoustic wave AW1, and interference would occur between the first compensating wave and the first acoustic wave AW1. Accordingly, in the frequency responses of the first sound producing component 110 and the compensated sound producing component CPC, the peak and/or the dip would be flattened by the interference between the first compensating wave and the first acoustic wave AW1.

The value of the phase delay of the first compensating wave would determine the flattening effect of the peak and/or the dip. In the present invention, the phase delay of the first compensating wave may be greater than 0 and less than the target wavelength (λ) with respect to the first acoustic wave AW1. For example, if the phase delay of the first compensating wave is half of the target wavelength (λ/2) with respect to the first acoustic wave AW1 (i.e., a 180-degrees phase delay), the best flattening effect would be performed (e.g., the destructive interference is performed), and the peak and/or the dip would be flattened significantly. For example, if the phase delay of the first compensating wave is a quarter of the target wavelength (λ/4) substantially (i.e., a 90-degrees phase delay), the great flattening effect would be performed to flatten and moderate the peak and/or the dip.

In the structure of the back cavity structure 130 in the first type TP1, as shown in FIG. 1, the back cavity structure 130 has a connecting port 132 connected to the first sound producing component 110, and the back cavity 130*i* is connected to the outside of the back cavity structure 130 only through the connecting port 132, where the back cavity 130*i* may be viewed as (being in form of) a sealed back volume for the first sound producing component 110, i.e., the back cavity structure 130 comprises a sealed back volume. Namely, in the back cavity structure 130, except for the connecting port 132, the other parts are hermetically sealed. For example, the back cavity structure 130 is a resonance chamber.

The value of the phase delay of the first compensating wave may be designed based on requirement(s), and the value of the phase delay of the first compensating wave is related to the design of the back cavity structure 130. In the back cavity structure 130 with the first type TP1, at least a portion of the size of the back cavity structure 130 may be designed to relate to the target wavelength (e.g., the target peak wavelength corresponding to the target peak or the target dip wavelength corresponding to the target dip), such that the target peak and/or the target dip may be flattened by the back cavity structure 130.

In some embodiments, the back cavity structure 130 may include at least one sub-part 134, the connecting port 132 is connected between the sub-part 134 and the first sound producing component 110, and the size of the sub-part 134 is related/corresponding to the target wavelength/frequency. The number of the sub-part(s) 134 and the shape of the sub-part 134 may be designed based on requirement(s), wherein the shape of the sub-part 134 may be a polygon (i.e., a rectangle or a rectangle with chamfers), a shape having a curved edge or other suitable shape.

The value of the phase delay of the first compensating wave is equal to a portion target wavelength corresponding by the size (e.g., the length) of the sub-part 134; namely, in the target wavelength, the value of the phase delay of the first compensating wave is proportional to the size (e.g., the length) of the sub-part 134. For example, the size (e.g., the length) of the sub-part 134 is corresponding to (e.g., equal to) half of the target wavelength (λ/2) or a quarter of the target wavelength (λ/4), wherein the phase delay of the first compensating wave is half of the target wavelength (λ/2) with respect to the first acoustic wave AW1 (i.e., a 180-degrees phase delay) if the size (e.g., the length) of the sub-part 134 is corresponding to (e.g., equal to) half of the target wavelength (λ/2), and the phase delay of the first compensating wave is a quarter of the target wavelength (λ/4) with respect to the first acoustic wave AW1 (i.e., a 90-degrees phase delay) if the size (e.g., the length) of the sub-part 134 is corresponding to (e.g., equal to) a quarter of the target wavelength (λ/4), but not limited thereto. Note that, λ=c/f, where c is speed of sound and f is corresponding target frequency.

In FIG. 1, the back cavity structure 130 may include a first sub-part 134*a* and a second sub-part 134*b*, and the size (e.g., the length) of the first sub-part 134*a* may be different from the size (e.g., the length) of the second sub-part 134*b*, such that the first sub-part 134*a* and the second sub-part 134*b* may be related to different target wavelengths/frequencies.

As shown in FIG. 2 illustrating a back cavity structure 130 of an embodiment of the first type TP1 (FIG. 1), the size (i.e., the length) of the first sub-part 134*a* is greater than the size (i.e., the length) of the second sub-part 134*b*, and shape of the first sub-part 134*a* and the shape of the second sub-part 134*b* are rectangles, but not limited thereto. In FIG. 2, the shape of the back cavity structure 130 is a rectangle, but not limited thereto.

As shown in FIG. 3 illustrating a back cavity structure 130 of another embodiment of the first type TP1 (FIG. 1), the back cavity structure 130 may further include a third sub-part 134*c* and a fourth sub-part 134*d*, wherein the sizes (i.e., the lengths) of four sub-parts 134 are different, and shapes of four sub-parts 134 are strip shapes with curved edges, but not limited thereto. In FIG. 3, the shape of the back cavity structure 130 is a spiral (or shapes of the sub-parts (e.g., 134*a*-134*d*) are spiral), so as to reduce the lateral size of the back cavity structure 130 in the horizontal direction, but not limited thereto.

The acoustic device 100 may further include any suitable structure and/or any suitable component based on requirement(s). For example, in FIG. 1, the outer housing structure 150 has a vent 154 connected to the first cavity CB1, so as to enhance the quality of the sound, but not limited thereto.

As the result, in the acoustic device 100 with the first type TP1, a final acoustic wave propagating towards outside the acoustic device 100 is form by the superposition of the first acoustic wave AW1, the first compensating wave and the third acoustic wave AW3.

Figure 4:
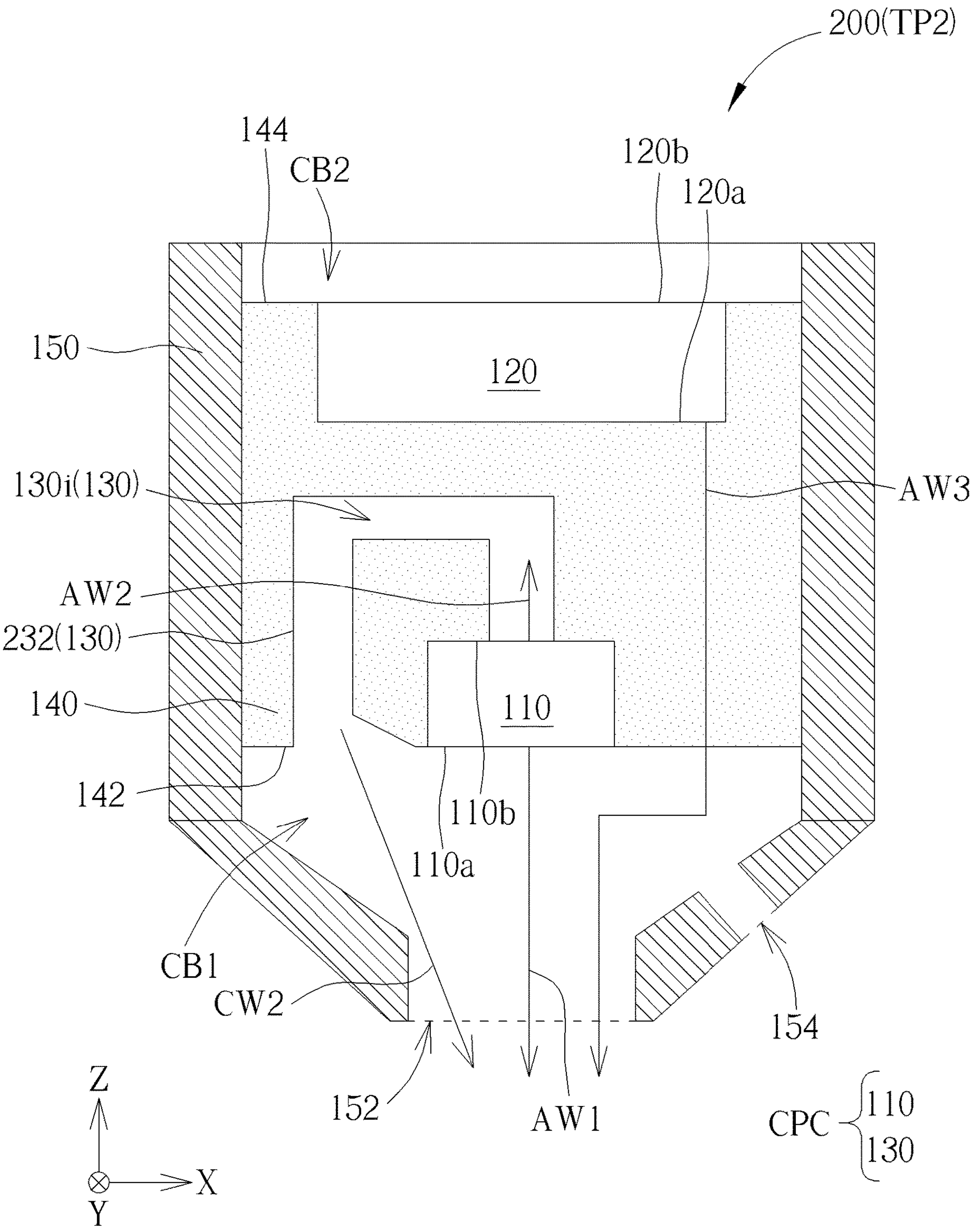
FIG. 4 is a schematic diagram of a cross sectional view illustrating an acoustic device according to an embodiment of a second type of the present invention.

Referred to FIG. 4, FIG. 4 is a schematic diagram of a cross sectional view illustrating an acoustic device according to an embodiment of a second type of the present invention. A difference between the first type TP1 shown in FIG. 1 and the second type TP2 shown in FIG. 4 is the design of the back cavity structure 130. As shown in FIG. 4, in the acoustic device 200 of the second type TP2, the back cavity structure 130 is or comprises an air channel 232, which can be viewed that the back cavity 130*i* is in a form as the air channel 232. In the air channel 232 of the back cavity structure 130, an end of the air channel 232 is connected to the first back side 110*b* of the first sound producing component 110, and another end of the air channel 232 faces the sound propagating opening 152. For example, the air channel 232 of the back cavity structure 130 has a suitable shape (e.g., a U-shape).

The air channel 232 is related to and corresponding to the target wavelength (e.g., the target peak wavelength corresponding to the target peak or the target dip wavelength corresponding to the target dip), such that a part of the second acoustic wave AW2 corresponding to the target wavelength (in the following, this part is referred as a second compensating wave CW2) passes through the air channel 232 and propagates towards the sound propagating opening 152.

In the back cavity structure 130 with the second type TP2, the air channel 232 of the back cavity structure 130 may be designed to make the second compensating wave CW2 have a 180-degrees phase delay with respect to the original second acoustic wave AW2. Since the phase difference between the first acoustic wave AW1 and the original second acoustic wave AW2 is 180 degrees, and the second compensating wave CW2 have a 180-degrees phase delay with respect to the original second acoustic wave AW2, a phase difference between the second compensating wave CW2 and the first acoustic wave AW1 is 360-degrees or 0 substantially. Thus, when the second compensating wave CW2 propagates out of the air channel 232 of the back cavity structure 130, the interference (e.g., the constructive interference) would occur between the second compensating wave CW2 and the first acoustic wave AW1. For example, if the first acoustic wave AW1 has a target dip corresponding to the target dip wavelength, since the phase difference between the second compensating wave CW2 with the target dip wavelength and the first acoustic wave AW1 is 0, the SPL caused by the second compensating wave CW2 with the target dip wavelength and the SPL caused by the first acoustic wave AW1 with the target dip wavelength would be added, such that the SPL in the target dip wavelength is increased, so as to flatten the dip of the frequency response of the first sound producing component 110.

The number of the air channel(s) 232 may be designed based on requirement(s). Different air channels 232 may be corresponding to different target wavelengths, so as to flatten the dip(s) and/or peak(s) of the frequency response of the first sound producing component 110, wherein different air channel 232 causes different second compensating waves CW2 with different target wavelengths.

Similar to the first type TP1, the holder 140 of the embodiment of the second type TP2 may include at least one air passage AP (the air passage AP is shown in FIG. 5 to FIG. 10) connected between the first holding side 142 and the second holding side 144, and the third acoustic wave AW3 may pass through the air passage AP from the second holding side 144 towards the first holding side 142, such that the third acoustic wave AW3 propagates towards the sound propagating opening 152.

As the result, in the acoustic device 200 with the second type TP2, a final acoustic wave propagating towards outside the acoustic device 200 is form by the superposition of the first acoustic wave AW1, the second compensating wave CW2 and the third acoustic wave AW3.

Figure 5:
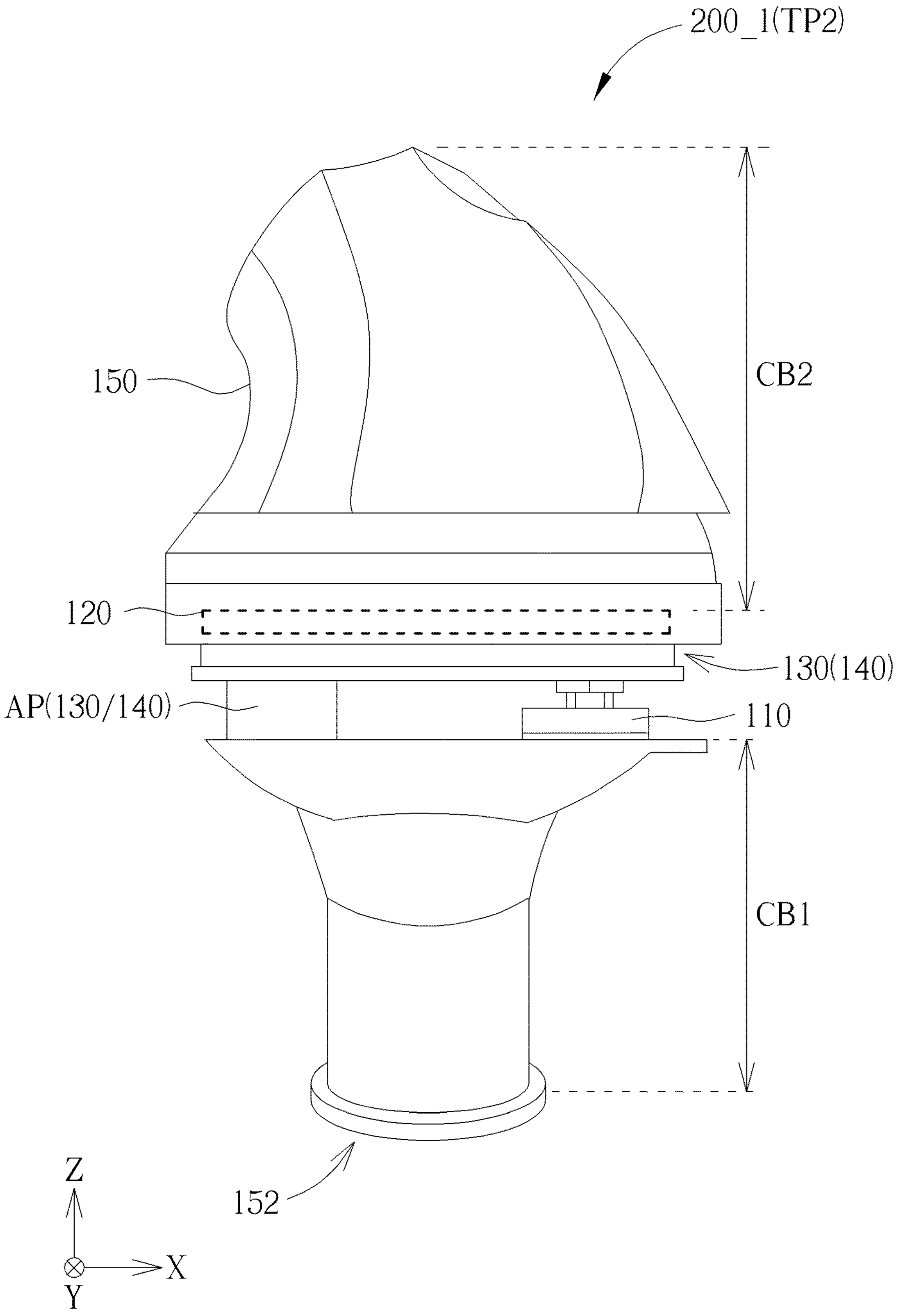
FIG. 5 is a schematic diagram illustrating an acoustic device according to an embodiment of the second type of the present invention.
Figure 6:
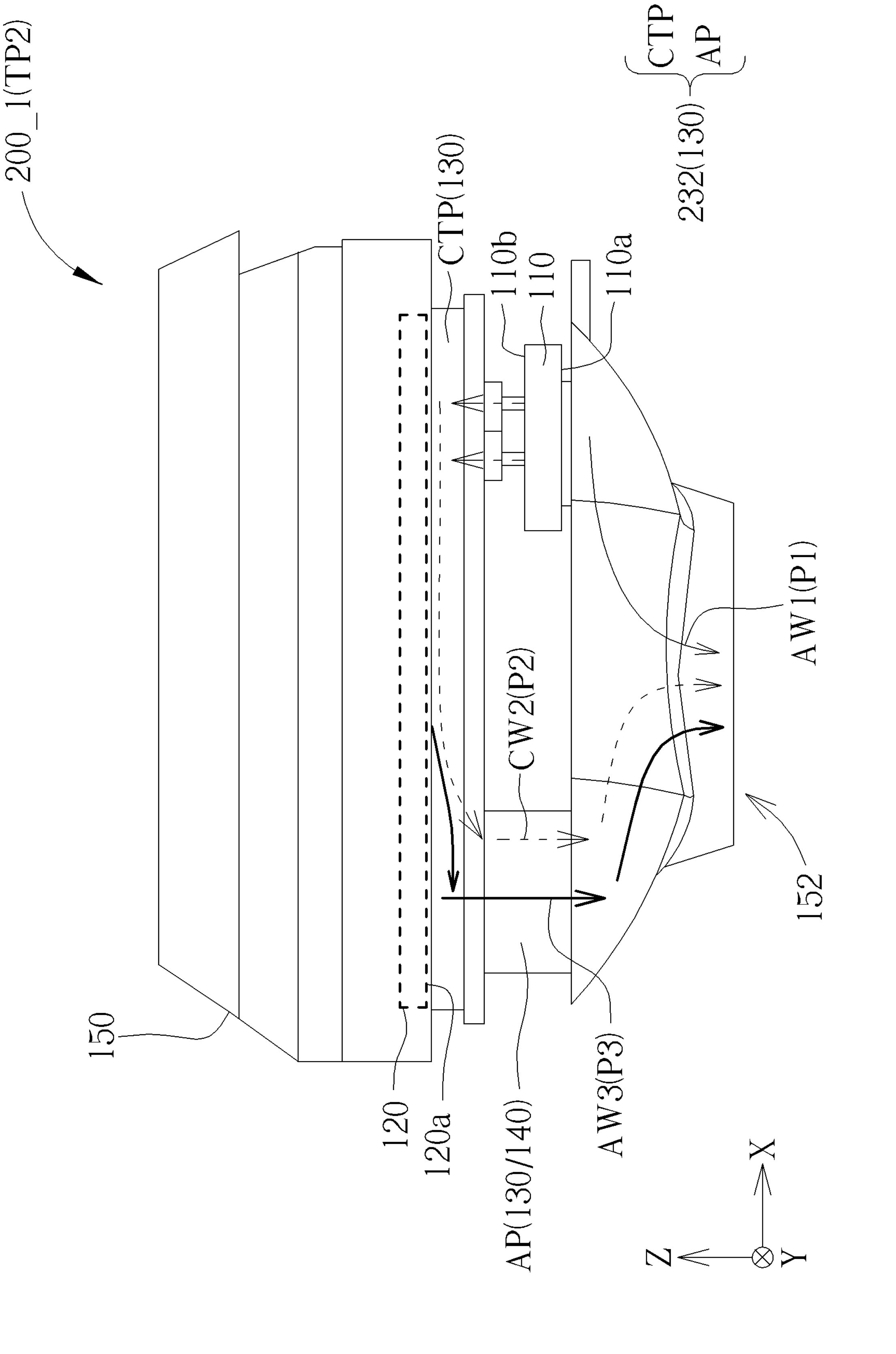
FIG. 6 is a schematic diagram illustrating paths of acoustic waves of the acoustic device according to the embodiment shown in FIG. 5.

Referring to FIG. 5 and FIG. 6, FIG. 5 is a schematic diagram illustrating an acoustic device according to an embodiment of the second type of the present invention, and FIG. 6 is a schematic diagram illustrating paths of acoustic waves of the acoustic device according to the embodiment shown in FIG. 5. Note that the structure of the acoustic device 200_1, a shape of the outer housing structure 150 and an arrangement of the components in the acoustic device 200_1 are not limited by FIG. 5 and FIG. 6. In FIG. 5 and FIG. 6, a hollow part between the air passage AP and the first sound producing component 110 may be an empty space or a solid structure. For example, the hollow part in FIG. 5 and FIG. 6 is a solid structure included in the holder 140.

As shown in FIG. 6, three paths of the acoustic waves are shown, wherein a first path P1 of the first acoustic wave AW1 is shown in fine line in FIG. 6, a second path P2 of the second compensating wave CW2 (a part of the second acoustic wave AW2) is shown in fine dashed line in FIG. 6, and a third path P3 of the third acoustic wave AW3 is shown in coarse line in FIG. 6. The first path P1 goes through the first front side 110*a* of the first sound producing component 110 and the sound propagating opening 152 in sequence. The second path P2 goes through the first back side 110*b* of the first sound producing component 110, the back cavity structure 130 (i.e., the air channel 232) and the sound propagating opening 152. The third path P3 goes through the second front side 120*a* of the second sound producing component 120, the air passage AP and the sound propagating opening 152.

As shown in FIG. 6, the air channel 232 of the back cavity structure 130 includes a connecting passage CTP and at least a part of the air passage AP, wherein the connecting passage CTP is connected between the first back side 110*b* of the first sound producing component 110 and the air passage AP. Therefore, the second compensating wave CW2 propagates towards the sound propagating opening 152 by passing through the connecting passage CTP and the air passage AP.

In FIG. 6, since the third acoustic wave AW3 propagates towards the sound propagating opening 152 by passing through the air passage AP, the third acoustic wave AW3 passes through at least a portion of the air channel 232 of the back cavity structure 130. Accordingly, the third path P3 of the third acoustic wave AW3 may overlap a portion of the second path P2 of the second compensating wave CW2.

Figure 7:
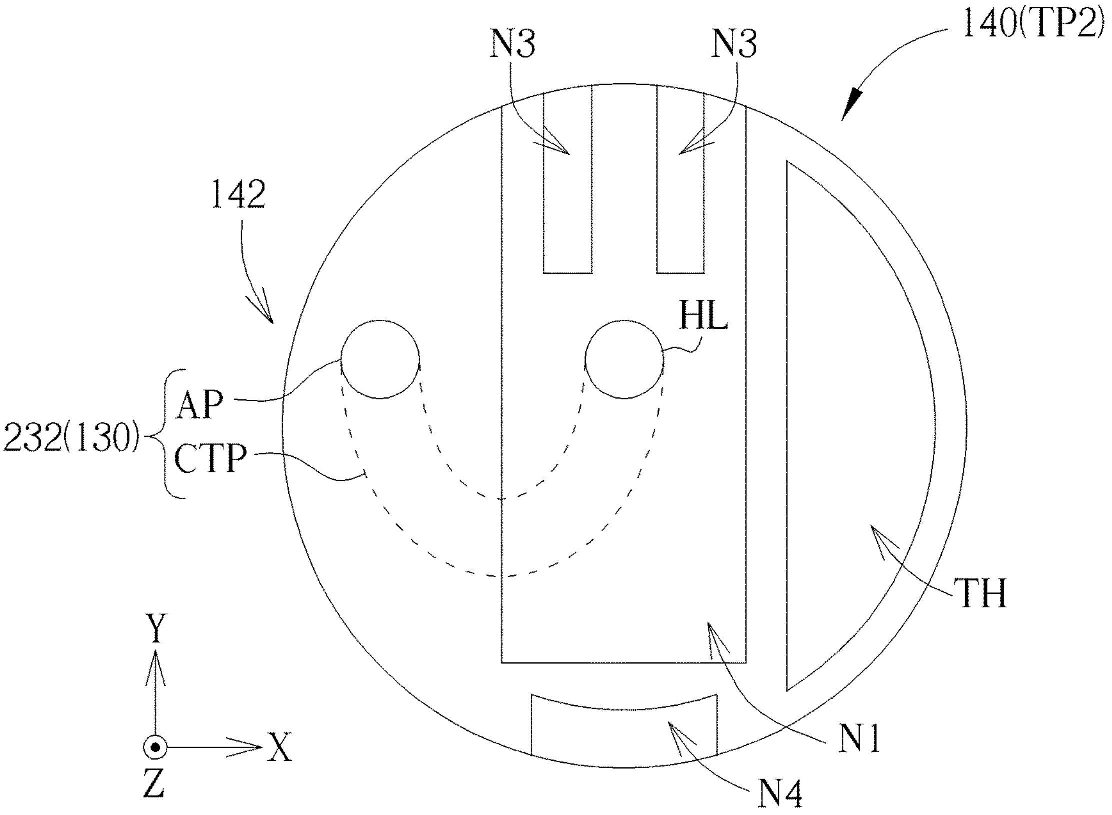
FIG. 7 is a schematic diagram illustrating a top view of a holder of an acoustic device according to an embodiment of the second type of the present invention.
Figure 8:
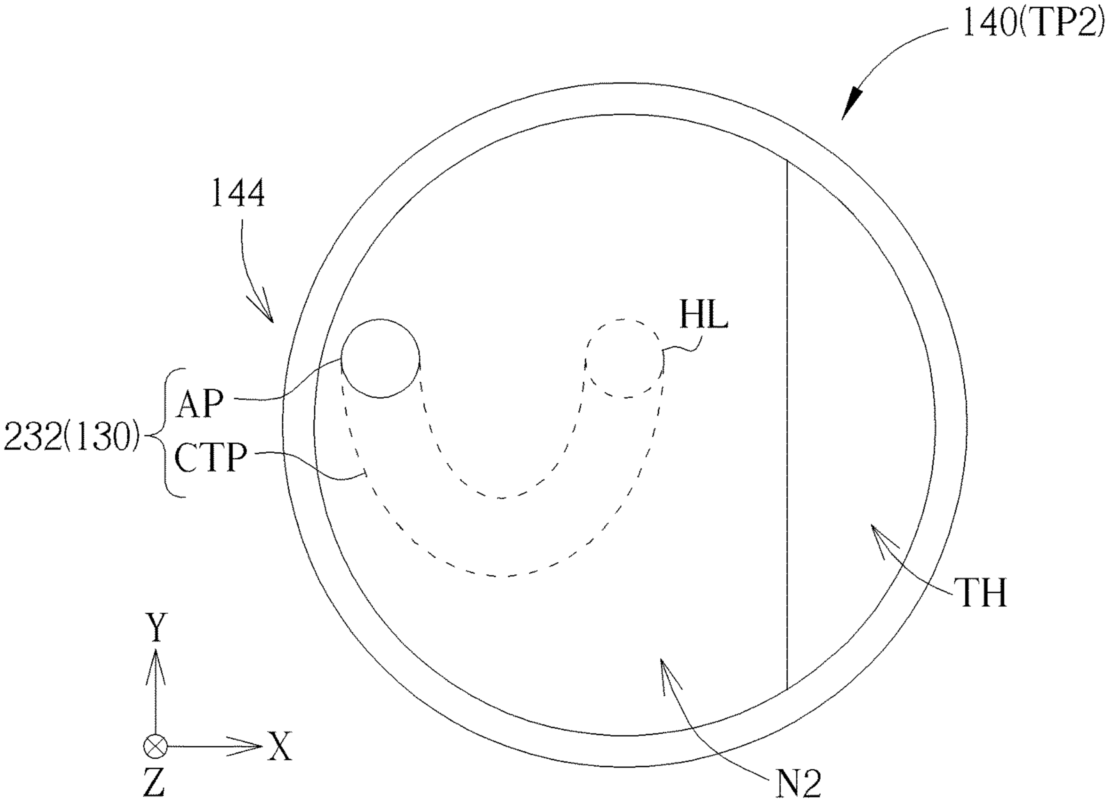
FIG. 8 is a schematic diagram illustrating a bottom view of a holder of an acoustic device according to an embodiment of the second type of the present invention.

Referring to FIG. 7 and FIG. 8, FIG. 7 is a schematic diagram illustrating a top view of a holder of an acoustic device according to an embodiment of the second type of the present invention, and FIG. 8 is a schematic diagram illustrating a bottom view of a holder of an acoustic device according to an embodiment of the second type of the present invention. FIG. 7 shows the first holding side 142 of the holder 140, and FIG. 8 shows the second holding side 144 of the holder 140.

As shown in FIG. 7, the first sound producing component 110 is disposed in a first notch N1, the first back side 110*b* of the first sound producing component 110 faces the first holding side 142 of the holder 140, and the second acoustic wave AW2 propagates towards the sound propagating opening 152 through the back cavity structure 130 (air channel 232), wherein the back cavity structure 130 (air channel 232) includes the connecting passage CTP (e.g., a U-shaped connecting passage) and a part of the air passage AP, an end of the connecting passage CTP is a hole HL in the first notch N1, and another end of the connecting passage CTP is connected to the middle of the air passage AP. In FIG. 7 and FIG. 8, the connecting passage CTP may be between the first holding side 142 and the second holding side 144, but not limited thereto. In FIG. 7 and FIG. 8, the air passage AP may be a through hole, but not limited thereto.

As shown in FIG. 8, the second sound producing component 120 is disposed in a second notch N2, the second front side 120*a* of the second sound producing component 120 faces the second holding side 144 of the holder 140, and the third acoustic wave AW3 propagates towards the sound propagating opening 152 through the air passage AP.

The holder 140 may include any suitable structure based on requirement(s). For example, two third notches N3 are disposed in the first notch N1, wherein conductive lines may be disposed in the third notches N3 for being electrically connected between the first sound producing component 110 and an outer device. For example, a fourth notch N4 is disposed adjacent to the first notch N1. For example, another through hole TH connected between the first holding side 142 and the second holding side 144 is disposed adjacent to the first notch N1.

Figure 9:
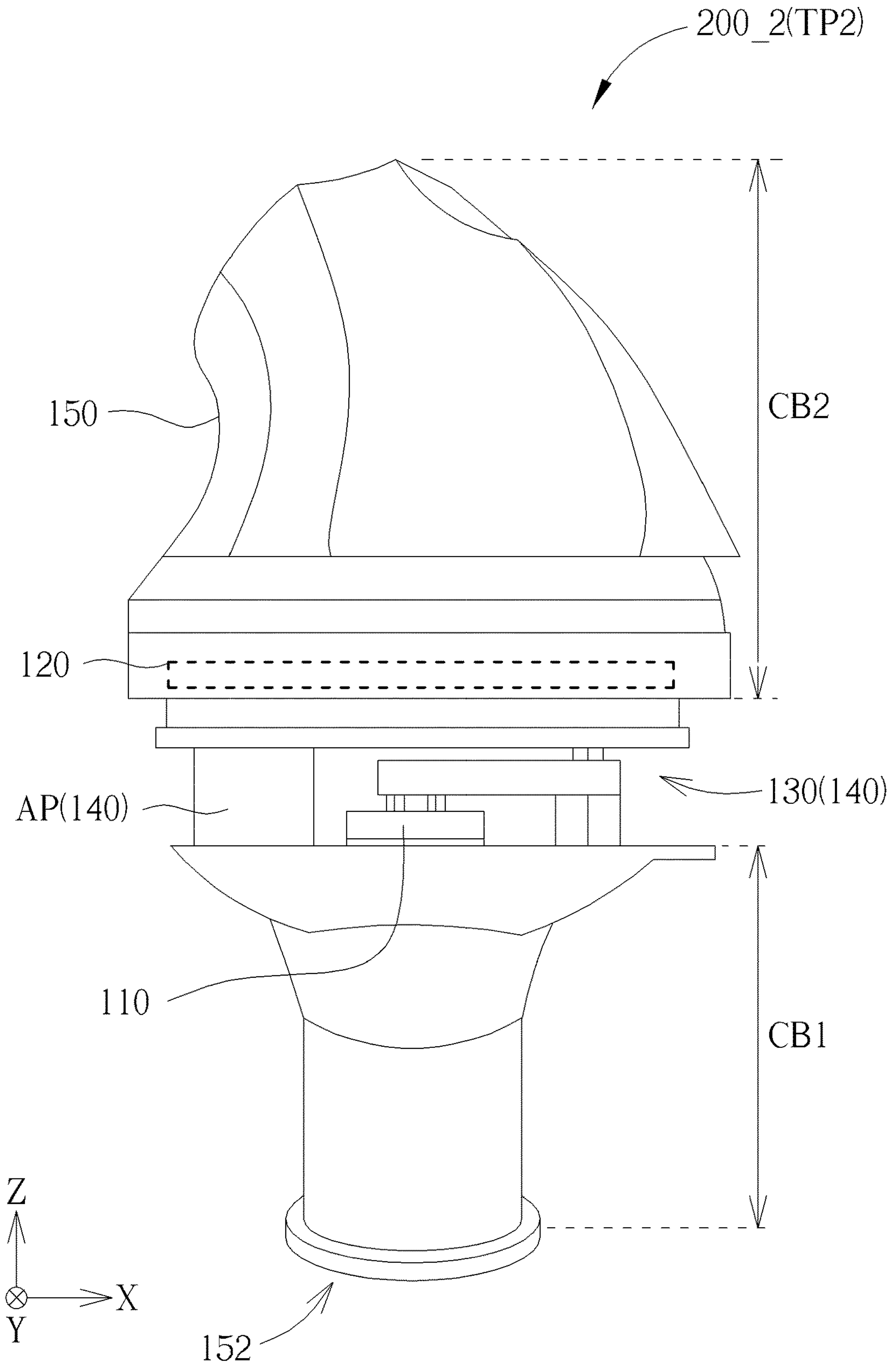
FIG. 9 is a schematic diagram illustrating an acoustic device according to an embodiment of the second type of the present invention.
Figure 10:
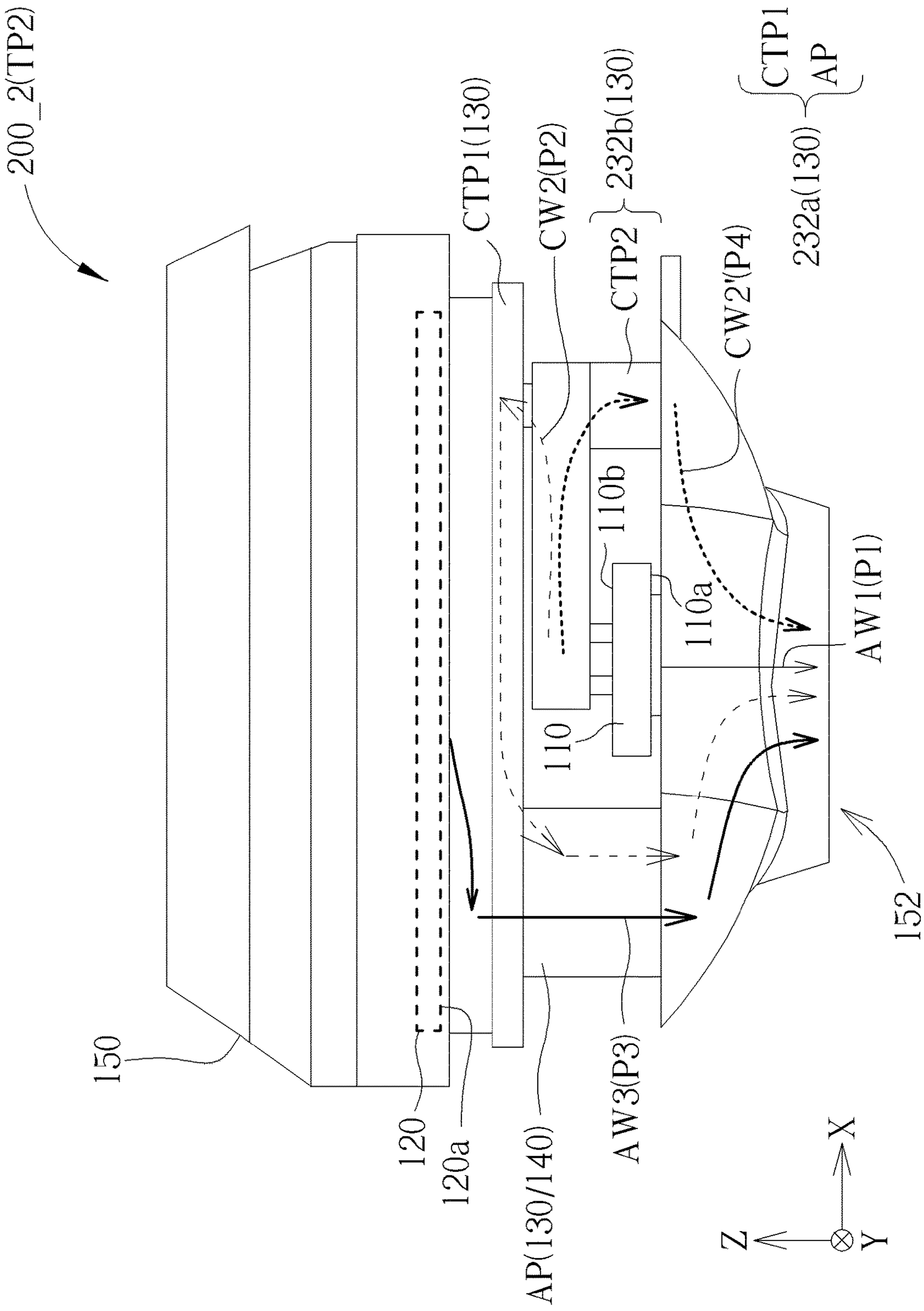
FIG. 10 is a schematic diagram illustrating paths of acoustic waves of the acoustic device according to the embodiment shown in FIG. 9.

Referring to FIG. 9 and FIG. 10, FIG. 9 is a schematic diagram illustrating an acoustic device according to an embodiment of the second type of the present invention, and FIG. 10 is a schematic diagram illustrating paths of acoustic waves of the acoustic device according to the embodiment shown in FIG. 9. Compared with the embodiment shown in FIG. 5 and FIG. 6, in the acoustic device 200_2, a fourth path P4 of another second compensating wave CW2' (another part of the second acoustic wave AW2) is shown in coarse dotted line in FIG. 10, wherein the second compensating wave CW2 propagated along the second path P2 and the another second compensating wave CW2' propagated along the fourth path P4 has different target wavelengths. The second path P2 goes through the first back side 110*b* of the first sound producing component 110, a part of the back cavity structure 130 (i.e., a first air channel 232*a*) and the sound propagating opening 152, and the fourth path P4 goes through the first back side 110*b* of the first sound producing component 110, another part of the back cavity structure 130 (i.e., a second air channel 232*b*) and the sound propagating opening 152.

As shown in FIG. 10, the first air channel 232*a* of the back cavity structure 130 includes a first connecting passage CTP1 and at least a part of the air passage AP, wherein the first connecting passage CTP1 is connected between the first back side 110*b* of the first sound producing component 110 and the air passage AP. Therefore, the second compensating wave CW2 propagates towards the sound propagating opening 152 by passing through the first connecting passage CTP1 and the air passage AP.

As shown in FIG. 9 and FIG. 10, the second air channel 232*b* of the back cavity structure 130 includes a second connecting passage CTP2, wherein the second connecting passage CTP2 is connected between the first back side 110*b* of the first sound producing component 110 and the first cavity CB1 of the outer housing structure 150. Therefore, the another second compensating wave CW2' propagates towards the sound propagating opening 152 by passing through the second connecting passage CTP2.

Note that the structure of the acoustic device 200_2, a shape of the outer housing structure 150 and an arrangement of the components in the acoustic device 200_2 are not limited by FIG. 9 and FIG. 10.

In summary, according to the design of the back cavity structure, the acoustic device has the flatter frequency response, so as to have easy operation and high performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acoustic device, comprising:

a first sound producing component having a first front side and a first back side, wherein the first sound producing component is a high frequency sound unit, and the first front side faces a sound propagating opening of the acoustic device; and a back cavity structure connected to the first back side of the first sound producing component;

wherein the first sound producing component produces a first acoustic wave from the first front side towards the sound propagating opening, and the first sound producing component produces a second acoustic wave from the first back side towards a back cavity of the back cavity structure;

wherein the back cavity structure is configured to flatten a peak or a dip of a frequency response of the first sound producing component;

wherein a length of an acoustic path within the back cavity is a half wavelength or a quarter wavelength corresponding to a frequency, such that the frequency response of the first sound producing component at the frequency is flattened.

2. The acoustic device of claim 1, further comprising a second sound producing component, wherein the second sound producing component is a low frequency sound unit.

3. The acoustic device of claim 1, further comprising a second sound producing component, wherein the back cavity structure is between the second sound producing component and the first sound producing component.

4. The acoustic device of claim 1, further comprising a holder having the back cavity structure, wherein the first sound producing component is disposed on a first holding side of the holder.

5. The acoustic device of claim 4, further comprising a second sound producing component disposed on a second holding side of the holder, wherein the second holding side is opposite to the first holding side.

6. The acoustic device of claim 5, wherein the holder comprises an air passage connected between the first holding side and the second holding side, and the second sound producing component is configured to produce a third acoustic wave;

wherein the first acoustic wave propagates from the first holding side of the holder towards the sound propagating opening, and the third acoustic wave propagates from the second holding side towards the sound propagating opening by passing through the air passage.

7. The acoustic device of claim 1, wherein a phase difference between the first acoustic wave and the second acoustic wave is 180 degrees.

8. The acoustic device of claim 1, wherein the back cavity structure has a connecting port connected to the first sound producing component, and the back cavity is connected to an outside of the back cavity structure only through the connecting port.

9. The acoustic device of claim 8, wherein the back cavity structure resonates to flatten the peak or the dip of the frequency response of the first sound producing component.

10. The acoustic device of claim 1, wherein a first wavelength is corresponding to the peak or the dip in the frequency response of the first sound producing component, the back cavity structure comprises a first sub-part, and a size of the first sub-part is corresponding to half of the first wavelength or a quarter of the first wavelength.

11. The acoustic device of claim 1, wherein the back cavity structure comprises a first sub-part and a second sub-part, and a size of the first sub-part is different from a size of the second sub-part.

12. The acoustic device of claim 1, wherein the back cavity structure comprises an air channel.

13. The acoustic device of claim 12, wherein an end of the air channel is connected to the first back side of the first sound producing component, and another end of the air channel faces the sound propagating opening of the acoustic device.

14. The acoustic device of claim 12, wherein the air channel of the back cavity structure is corresponding to a first wavelength;

if the second acoustic wave has a wave with the first wavelength, the air channel of the back cavity structure makes the wave with the first wavelength have a 180-degrees phase delay.

15. The acoustic device of claim 12, further comprising a second sound producing component configured to produce a third acoustic wave towards the sound propagating opening, wherein the third acoustic wave passes through at least a portion of the air channel of the back cavity structure.

16. The acoustic device of claim 1, wherein the first sound producing component is a micro-speaker.

17. The acoustic device of claim 1, wherein the first sound producing component is a micro electro mechanical system (MEMS) fabricated micro-speaker.

18. The acoustic device of claim 1, wherein a membrane resonance frequency of the first sound producing component is greater than 13 KHz.

19. The acoustic device of claim 1, wherein the first sound producing component comprises a first membrane subpart and a second membrane subpart;

wherein the first membrane subpart is opposite to the second membrane subpart.

20. The acoustic device of claim 1, wherein an aspect ratio of the first sound producing component or an aspect ratio of a membrane of the first sound producing component is greater than 2.

21. The acoustic device of claim 1, wherein the acoustic device is an earbud.

22. A holder, disposed or to be disposed within an acoustic device, comprising:

a back cavity structure, formed within the holder;

wherein when the holder is disposed within the acoustic device, a first sound producing component is disposed on the holder, the back cavity structure is connected to a first back side of the first sound producing component, the first sound producing component produces a first acoustic wave from a first front side towards a sound propagating opening of the acoustic device, and the first sound producing component produces a second acoustic wave from the first back side towards a back cavity of the back cavity structure;

wherein the first sound producing component is a high frequency sound unit;

wherein a length of an acoustic path within the back cavity is a half wavelength or a quarter wavelength corresponding to a frequency, such that a frequency response of the first sound producing component at the frequency is flattened.

23. The holder of claim 22, wherein the back cavity structure comprises a sealed back volume.

24. The holder of claim 22, wherein the back cavity structure comprises a plurality of sub-parts;

wherein lengths of a plurality of acoustic paths within the plurality of sub-parts are corresponding to a plurality of target frequencies;

wherein the frequency response of the first sound producing component at the plurality of target frequencies are flattened.

25. The holder of claim 22, wherein a shape of the back cavity structure is spiral.

26. The holder of claim 22, wherein the back cavity structure comprises an air channel.

27. The holder of claim 26, wherein an end of the air channel is connected to the first back side of the first sound producing component, and another end of the air channel faces the sound propagating opening of the acoustic device.

28. The holder of claim 26, wherein the air channel is U-shaped.

29. The holder of claim 22, wherein the acoustic device comprises a second sound producing component;

wherein the second sound producing component is a low frequency sound unit.

30. The holder of claim 22, wherein the acoustic device is an earbud.

* * * * *